Figure 1:
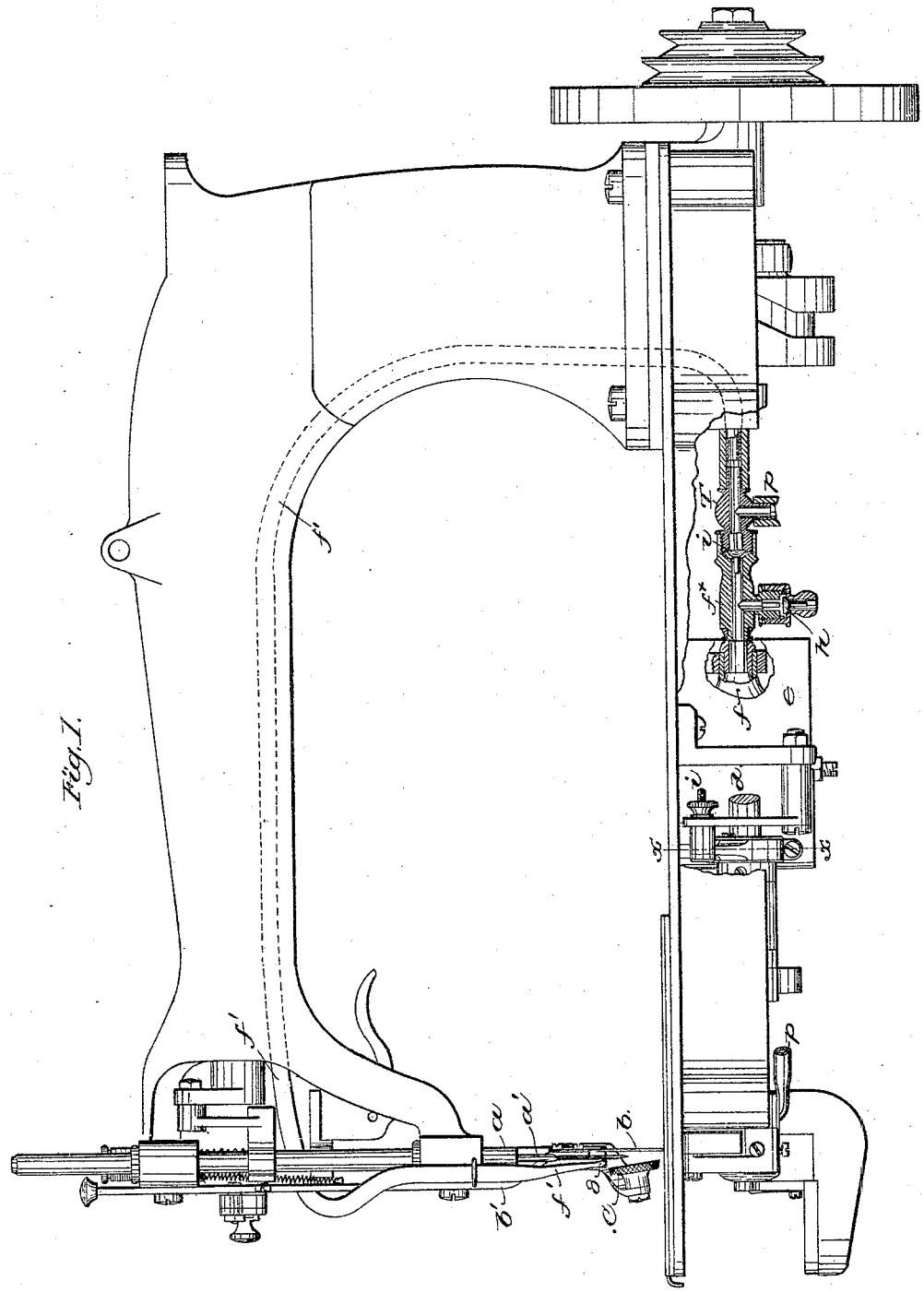

(No Model.) 2 Sheets—Sheet 1.

W. A. NEELY.
TRIMMING MECHANISM FOR SEWING MACHINES.

No. 286,146. Patented Oct. 2, 1883.

Witnesses
Fred A. Powell
John F. C. Prinkert

Inventor
William A. Neely
by Crosby & Gregory attys.

(No Model.) 2 Sheets—Sheet 2.
W. A. NEELY.
TRIMMING MECHANISM FOR SEWING MACHINES.
No. 286,146. Patented Oct. 2, 1883.
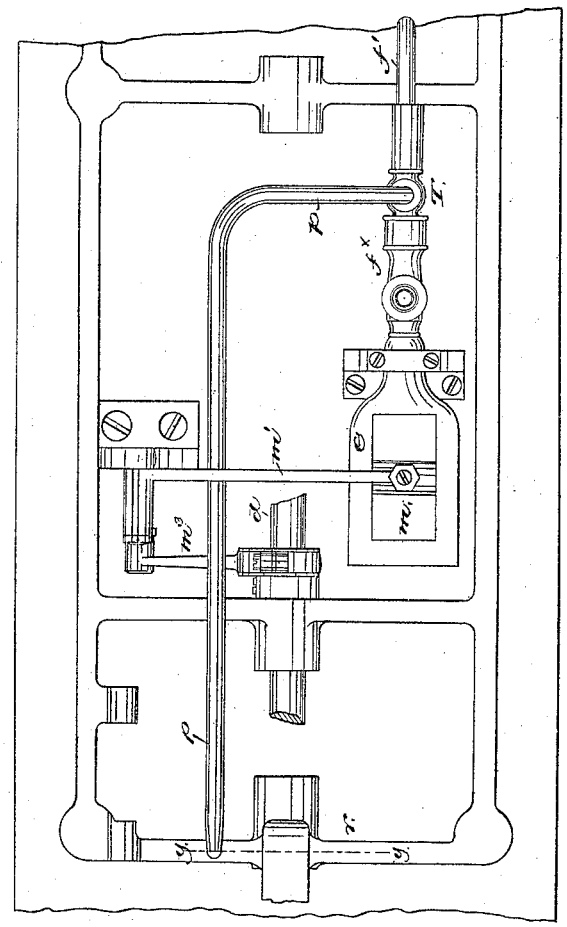
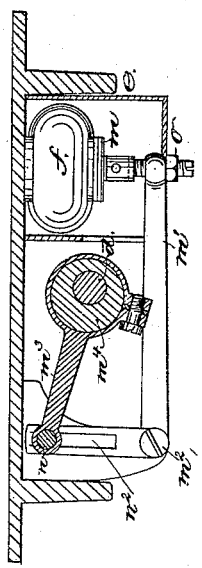
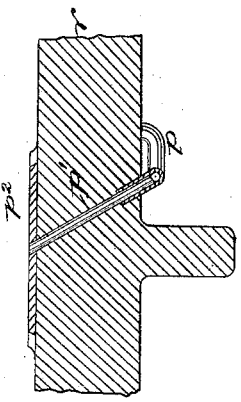

UNITED STATES PATENT OFFICE.

WILLIAM A. NEELY, OF LYNN, MASS., ASSIGNOR TO THE WHEELER & WILSON MANUFACTURING COMPANY, OF BRIDGEPORT, CONN.

TRIMMING MECHANISM FOR SEWING-MACHINES.

SPECIFICATION forming part of Letters Patent No. 286,146, dated October 2, 1883.

Application filed June 15, 1883. (No model.)

*To all whom it may concern:*

Be it known that I, WILLIAM A. NEELY, of Lynn, county of Essex, State of Massachusetts, have invented an Improvement in Trimming Mechanism for Sewing-Machines, of which the following description, in connection with the accompanying drawings, is a specification—like letters on the drawings representing like parts.

This invention relates to improvements in that class of sewing-machines which are employed to trim the edges of leather, fabrics, &c., and has for its object to blow from the throat or needle-hole plate and from the trimmer-throat the material which is removed from the edge of the article being trimmed.

This invention is an improvement on United States Patent No. 274,095, granted to me March 13, 1883, to which reference may be had. In the apparatus described in that patent the blast of air was shown as being produced by a pump; but by experiment I have found that I can get a more steady and powerful blast with the least strain upon the machine by locating the main part of the air-forcing apparatus where it may be operated by connections with the main shaft of the machine, and herein I have located the same under the bed-plate, and have arranged other parts of the said apparatus along the arm of the machine, whereby it is possible to deliver air near or so as to strike the throat-plate and remove the detached material therefrom, leaving the space under the trimming-blade clear and free from waste which tends to clog it.

Figure 1, in side elevation, represents a sewing-machine with its bed-plate partially broken out to show my invention embodied therewith. Fig. 2 is a partial under side view thereof with the case for the air-forcing apparatus removed; Fig. 3, a section on the line $x\,x$, Fig. 1; and Fig. 4, a partial section of Fig. 2 on the line $y\,y$.

The sewing-machine shown in the drawings is a Wheeler & Wilson No. 10, and, being well known, it need not be further described. In it the needle-bar $a$, needle $a'$, blade or trimmer $b$, and blade-carrier $b'$ are as commonly used in the said machine and in my patent referred to. The presser-roller $c$ and main rotating shaft $d$ are as usual. At the under side of the bed-plate I have secured a case, $e$, in which I have placed an air-forcing device, (shown as an india-rubber bulb, $f$.) This bulb $f$ has a neck, $f'$, provided with an inlet-valve, $h$, and an outlet-valve, $i$, the latter being adapted to move away from its seat, as shown in Fig. 1, when the inlet-valve is closed and the air is being expelled from the bulb $f$; but the inlet-valve $h$ will move up away from its seat and the outlet-valve $i$ will close on its seat when the bulb is receiving air. Air in the bulb will pass out through the long pipe $f'$ when the bulb is compressed or collapsed by the action of the movable plate $m$, carried by the lever $m'$, pivoted at $m^2$, and actuated by the link $m^3$ and eccentric $m^4$ on the main rotating shaft $d$. The plate $m$, which presses against one side of the bulb to force the air from it, is made adjustable on the lever $m'$ by means of the adjusting-nut $o$, and the throw of the said lever is made adjustable by the screw $n$ in the slot $n^2$ of the short arm of the lever $m'$, such adjustments enabling the bulb to be used to its full or to but part of its capacity, thereby regulating the amount and force of the blast. The neck $f'$ beyond the outlet or check valve $i$ has a joint, $t$, with which is connected a second pipe, $p$, the front end of which enters an opening made in the web $r$ of the bed-plate, so that air forced along the said pipe enters the passage $p'$ in the said web, and passes therefrom through one or more openings made in the throat-plate $p^2$, near the slit in which the trimming blade or cutter works. By the pipe $f'$, the latter having its mouth at 8, I am enabled to deliver a blast of air against the throat-plate near the slit in which the blade $b$ works, to blow away the waste material, and by the pipe $p$, which delivers air below the throat-plate, the efficiency of the apparatus is increased.

The waste material may be blown away by a blast of air solely from the said throat-plate.

I claim—

1. In a sewing-machine, the flexible bulb, the lever, means to operate it automatically, and the adjustable plate $m'$ and the pipe $f'$, in connection with the said bulb, to conduct air therefrom against the throat-plate, combined with the throat-plate and trimmer-blade, to operate substantially as described.

2. In a sewing-machine, an air-forcing apparatus located below the bed-plate, the rotating shaft, and means actuated by it to operate the air-forcing apparatus, and a conducting-pipe, $f'$, combined with the throat-plate and with the trimmer-blade, to operate substantially as described.

3. An air-forcing apparatus, means to operate it, and a pipe, $p$, leading therefrom below the bed-plate to deliver a blast of air against the under side of the material at or near the throat-plate, combined with a needle and a trimmer-blade located above the material, substantially as described.

In testimony whereof I have signed my name to this specification in the presence of two subscribing witnesses.

WILLIAM A. NEELY.

Witnesses:
G. W. GREGORY,
B. J. NOYES.